(12) United States Patent
Deardurff (10) Patent No.: US 7,741,385 B2
(45) Date of Patent: Jun. 22, 2010

(54) OZONE STABLE INK-JET INKS

(75) Inventor: Larrie Deardurff, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 169 days.

(21) Appl. No.: 11/555,069

(22) Filed: Oct. 31, 2006

(65) Prior Publication Data

US 2008/0188595 A1 Aug. 7, 2008

(51) Int. Cl.
*C09D 11/00* (2006.01)
*C09D 1/00* (2006.01)
*B41M 5/165* (2006.01)

(52) U.S. Cl. .................... 523/160; 523/161; 106/31.01; 106/31.13; 106/31.27; 106/31.6; 106/31.57; 106/31.59; 106/311

(58) Field of Classification Search ................. 523/160, 523/161; 528/25; 347/100, 102; 106/31.01, 106/31.13, 31.77, 31.6, 31.57, 31.59, 311
See application file for complete search history.

(56) References Cited

U.S. PATENT DOCUMENTS

| 2002/0014611 | A1  | 2/2002 | Taylor et al. |         |
|--------------|-----|--------|---------------|---------|
| 2003/0109662 | A1* | 6/2003 | Medsker et al. | 528/25 |
| 2003/0127019 | A1  | 7/2003 | Adamic et al. |         |
| 2004/0080595 | A1* | 4/2004 | Taguchi et al. | 347/100 |
| 2005/0004260 | A1  | 1/2005 | Taguchi       |         |
| 2005/0128268 | A1* | 6/2005 | Takashima     | 347/100 |
| 2005/0200671 | A1* | 9/2005 | Mistry et al. | 347/100 |
| 2007/0181034 | A1* | 8/2007 | Dodge et al.  | 106/31.46 |

FOREIGN PATENT DOCUMENTS

| EP | 1 138 729 A   | 10/2001 |
|----|---------------|---------|
| EP | 1 243 628 A   | 9/2002  |
| EP | 1 533 349 A   | 5/2005  |
| WO | 03/062324 A   | 7/2003  |
| WO | 2005/061635 A | 7/2005  |
| WO | 2006/030930 A | 3/2006  |
| WO | 2007/094879 A | 8/2007  |

* cited by examiner

*Primary Examiner*—Vasu Jagannathan
*Assistant Examiner*—Alexander C Kollias (57) ABSTRACT

An ink set includes an ozone stable cyan ink, and an ozone stable magenta ink. According to this exemplary embodiment, the ozone stable magenta ink includes an ozone stable magenta dye and a liquid vehicle including a fluorocarbon surfactant formed at least in part from a polymer comprising at least one Formula 1:

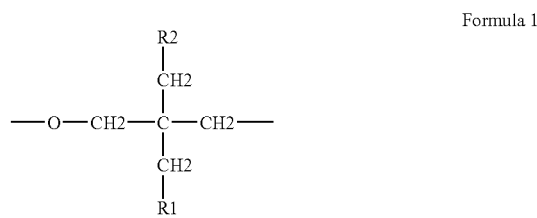

Formula 1

Where R1=OH and R2=O(CH2)$_m$-(CF2)$_n$CF3 with m=1-3 and n=0-3.

13 Claims, 1 Drawing Sheet

FIG. 1

OZONE STABLE INK-JET INKS

BACKGROUND

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers. Although there have been great improvements in ink-jet printing technology over the years, improvements can still be made in many areas.

As new ink-jet inks and print engines are developed, several traditional characteristics are considered when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging.

One characteristic of ink-jet printing systems that is desirable to achieve is related to optical density and bleed control. Additionally, achieving acceptable optical density and bleed control in ozone stable dyes is desired.

SUMMARY

In one aspect of the present system and method, an ink set includes an ozone stable cyan ink, and an ozone stable magenta ink. According to this exemplary embodiment, the ozone stable magenta ink includes an ozone stable magenta dye and a liquid vehicle including a fluorocarbon surfactant formed at least in part from a polymer comprising Formula 1:

Formula 1

Where R1=H, OH, or CH3; and R2=O(CH2)$_m$—(CF2)$_n$—CF3 with m=1-3 and n=0-3.

BRIEF DESCRIPTION OF THE DRAWINGS

The accompanying drawing illustrates various embodiments of the present invention and is a part of the specification. The illustrated embodiment is merely an example of the present invention and does not limit the scope of the invention.

Throughout the drawing, identical reference numbers designate similar, but not necessarily identical, elements.

DETAILED DESCRIPTION

The present specification discloses an exemplary inkjet ink formulation configured to control cyan to magenta bleed when using ozone stable dyes in inkjet inks. More particularly, a specific set of surfactants are disclosed that lower the surface tension of ozone stable magenta dyes sufficiently to prevent cyan to magenta bleed. Additionally, use of the specific set of surfactants also improves the cyan to magenta bleed that typically occurs when an image is stored under humid conditions. Further details of the present inkjet ink formulation will be provided below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In the present specification, and in the appended claims, the following terminology will be used:

The singular forms "a," "an," and "the" include plural referents unless the context clearly dictates otherwise. Thus, for example, reference to "a pigment" includes reference to one or more of such materials.

The term "about" when referring to a numerical value or range is intended to encompass the values resulting from experimental error that can occur when taking measurements.

As used herein, "liquid vehicle" is defined to include liquid compositions that can be used to carry colorants, including dyes, to a substrate. Liquid vehicles are well known in the art, and a wide variety of liquid vehicle components may be used in accordance with embodiments of the present system and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein, "dye" refers to an ink colorant that is typically substantially soluble in the liquid vehicle in which it is used.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used herein, "bleed" refers to the tendency of ink to run into and mix with adjacently printed inks. Bleed typically occurs prior to the printed inks fully drying on a substrate. The degree of bleed will depend on a variety of factors such as the drying speed of the ink, surface tensions of the inks, agglomeration of the colorant, and ink chemistry in general, among other variables.

In the following description, for purposes of explanation, numerous specific details are set forth in order to provide a thorough understanding of the present system and method for controlling cyan to magenta bleed when using new ozone stable dyes in inkjet inks. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
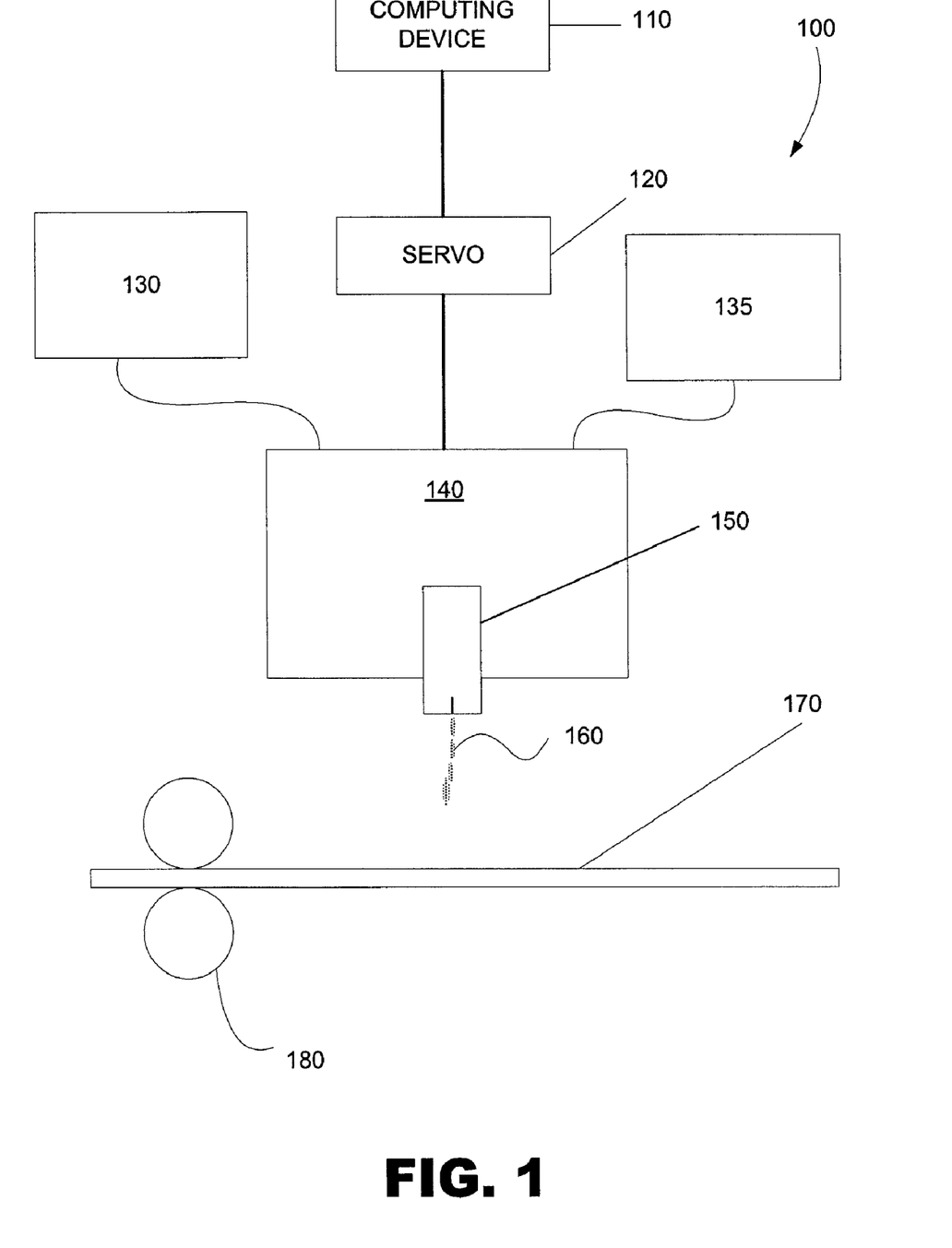
FIG. 1 is a simple block diagram illustrating an ink-jet material dispensing system, according to one exemplary embodiment.

FIG. 1 illustrates an exemplary system (100) that may be used to apply a dye-based ink-jet ink (160) to an ink receiving medium (170) according to one exemplary embodiment. As shown in FIG. 1, the present system includes a computing device (110) controllably coupled through a servo mechanism (120) to a moveable carriage (140) having an ink-jet dispenser (150) disposed thereon. A material reservoir (130) is also coupled to the moveable carriage (140), and consequently to the ink-jet print head (150). A number of rollers (180) are located adjacent to the ink-jet dispenser (150) configured to selectively position an ink receiving medium (170). While the present exemplary system (100) is described in the context of applying a dye-based ink-jet ink (160) onto an ink receiving medium (170), the present system and method may be used to mark any number of items with the present dye-based ink-jet ink. The above-mentioned components of the present exemplary system (100) will now be described in further detail below.

The computing device (110) that is controllably coupled to the servo mechanism (120), as shown in FIG. 1, controls the selective deposition of a dye-based ink-jet ink (160) on an ink receiving medium (170). A representation of a desired image or text may be formed using a program hosted by the computing device (110). That representation may then be converted into servo instructions that are then housed in a processor readable medium (not shown). When accessed by the computing device (110), the instructions housed in the processor readable medium may be used to control the servo mechanisms (120) as well as the movable carriage (140) and ink-jet dispenser (150). The computing device (110) illustrated in FIG. 1 may be, but is in no way limited to, a workstation, a personal computer, a laptop, a personal digital assistant (PDA), or any other processor containing device.

The moveable carriage (140) of the present printing system (100) illustrated in FIG. 1 is a moveable material dispenser that may include any number of ink-jet material dispensers (150) configured to dispense the present dye-based ink-jet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on an ink receiving medium (170), the computing device (110) may controllably position the moveable carriage (140) and direct one or more of the ink-jet dispensers (150) to selectively dispense a dye-based ink-jet ink at predetermined locations on ink receiving medium (170) as digitally addressed drops, thereby forming the desired image or text. The ink-jet material dispensers (150) used by the present printing system (100) may be any type of ink-jet dispenser configured to perform the present method including, but in no way limited to, thermally actuated ink-jet dispensers, mechanically actuated ink-jet dispensers, electrostatically actuated ink-jet dispensers, magnetically actuated dispensers, piezoelectrically actuated dispensers, continuous ink-jet dispensers, etc.

The material reservoir (130) that is fluidly coupled to the ink-jet material dispenser (150) houses the present dye-based ink-jet ink (160) prior to printing. The material reservoir may be any container configured to hermetically seal the dye-based ink-jet ink (160) prior to printing and may be constructed of any number of materials including, but in no way limited to metals, plastics, composites, or ceramics. As illustrated in FIG. 1, the material reservoir (130) may be separate from, yet fluidly coupled to the ink-jet material dispenser (150). Alternatively, the material reservoir (130) may be directly coupled to and form a part of the ink-jet material dispenser (150).

FIG. 1 also illustrates the components of the present system that facilitate reception of the dye-based ink-jet ink (160) onto the ink receiving medium (170). As shown in FIG. 1, a number of positioning rollers (180) may transport and/or positionally secure an ink receiving medium (170) during a printing operation. Alternatively, any number of belts, rollers, substrates, or other transport devices may be used to transport and/or postionally secure the ink receiving medium (170) during a printing operation, as is well known in the art.

Recently, it has been desirous that inkjet dispensing systems be configured to dispense inks that are ozone stable. As used here, the term "ozone stable" is meant to be understood as including any inkjet ink that does not rapidly break down after exposure to ozone. However, it has been observed that when ozone stable inks containing cyan were printed next to areas that contain ozone stable magenta dye, such as pure magenta or red, the cyan dye in a CYMK (cyan, yellow, magenta, black) system would migrate into the magenta containing area. Essentially, the ozone stable magenta dye from Fujihas surfactant-like properties that interact with the typical surfactants found in ink jet inks. This interaction causes the surface tension of the magenta ink to be in the 31-32 dynes region, whereas, other typical inks using the same surfactants would have a surface tension of 28-29 dynes. Consequently, the magenta based inkjet inks exhibited higher surface tensions than the cyan based inkjet inks, resulting in the cyan ink bleeding into the areas that contain magenta dye. This is especially true for higher ink density areas and for lower ink density areas when the image is stored under humid conditions. In order to prevent the resulting cyan to magenta bleed when using ozone stable inks, the present exemplary system and method incorporates a dye-based ink-jet ink (160) that utilizes a specific set of surfactants in combination with the ozone stable magenta dyes that lower the surface tension of ozone stable magenta dyes sufficiently to prevent cyan to magenta bleed. The formation and composition of the dye-based ink-jet ink (160) will now be described in detail below.

Exemplary Composition

In accordance with the present system and method, a system for printing images on a substrate can include a dye-based ink-jet ink (160) and a printhead or other material dispenser (150) loaded with the dye-based ink-jet ink. The present exemplary dye-based ink-jet ink configured to reduce cyan to magenta bleed may include, but is in no way limited to, at least one ozone stable dye; an aqueous formulation or liquid vehicle which can include water, co-solvents, buffering agents, biocides, sequestering agents, viscosity modifiers, humectants, binders, and/or other known additives; and any number of surfactants including at least one fluorocarbon surfactant formed at least in part from a polymer based on oxetane chemistry. The polymer in the fluorocarbon surfactant based on oxetane chemistry can be otherwise described as a polymer comprising Formula 1:

Formula 1

Where R1=H, OH, or CH3; and R2=O(CH2)$_m$-(CF2)$_n$-CF3 with m=1-3 and n=0-3.

Further details of each component of the present exemplary dye-based ink-jet ink (160) will be provided below.

Dye

According to one exemplary embodiment, an ozone stable magenta dye is provided in the magenta component of the inkjet ink formulation to impart magenta color to the resulting ink. According to this exemplary embodiment, appropriate dye-based inks include, but are in no way limited to commercially available ozone stable magenta dyes from Fuji such as having one of the following structures:

| $R_1$ | $R_2$ | $R_3$ | $R_4$ | $R_5$ | $R_6$ |
|---|---|---|---|---|---|
| —SCH$_3$ | CH$_3$ | CN | H | C$_8$H$_{17}$(t) | —C$_6$H$_4$—C$_8$H$_{17}$ |
| —C$_6$H$_5$ | H | CONH$_2$ | H | —C$_6$H$_4$—SO$_3$K | —C$_6$H$_4$—SO$_3$K |
| —S—CH$_2$CH$_2$—SO$_3$K | CH$_3$ | H | 2-methylbenzothiazol-6-yl-SO$_3$K | —C$_6$H$_4$—SO$_3$K | —C$_6$H$_4$—SO$_3$K |
| CH$_3$ | CH$_3$ | H | 2-methylbenzothiazol-6-yl-SO$_2$NH(CH$_2$)$_3$O-(2,4-di-t-amyl)phenyl | 2,4,6-trimethylphenyl | —C$_6$H$_4$—C$_8$H$_{17}$ |
| —C$_6$H$_5$ | H | H | 2-methylbenzothiazol-6-yl-NHSO$_2$-(2-OC$_8$H$_{17}$(n), 4-C$_8$H$_{17}$(t))phenyl | 2,4,6-trimethylphenyl | C$_8$H$_{17}$(t) |

| $R_1$ | $R_2$ | $R_3$ | $R_4$ | $R_5$ | $R_6$ |
|---|---|---|---|---|---|
| 5-CH$_3$ | H | CN | H | —C$_6$H$_4$—SO$_3$K | —C$_6$H$_4$—SO$_3$K |

-continued

| | | | | | |
|---|---|---|---|---|---|
| 5-NO$_2$ | CH$_3$ | H | SO$_2$CH$_3$ | *o-tolyl (2-methylphenyl)* | *2,4,6-trimethylphenyl* | or

| R$_1$ | R$_2$ | R$_3$ | R$_4$ | R$_5$ | R$_6$ |
|---|---|---|---|---|---|
| Me | CH$_3$ | CN | H | –C$_6$H$_4$–SO$_3$K | –C$_6$H$_4$–SO$_3$K |

Additionally, according to an embodiment, an ozone stable cyan dye is provided in the cyan component of the inkjet ink formulation to impart cyan color to the resulting ink.

In this embodiment, the ozone stable cyan dye comprises

Formula 4

Wherein M represents a hydrogen atom, a metal atom or an oxide, hydroxide or halide thereof; Pc represents a (k–1)-valent phthalocyanine nucleus represented by Formula 4; X represents both X$_1$ and X$_2$, with t representing a value of 0<t≦2; X$_1$ and X$_2$ each independently represents a substituent selected from the group consisting of —SO—R$_1$, —SO$_2$—R$_1$ and —SO$_2$NR$_2$R$_3$ and at least one substituent represented by X$_1$ and at least one substituent represented by X$_2$ are present in respective rings of four benzene rings (A, B, C and D Formula 4 of the phthalocyanine nucleus, provided that X$_1$ and X$_2$ are not the same and at least one of X$_1$ and X$_2$ has an ionic hydrophilic group as a substituent; R$_1$ represents a substituted or unsubstituted alkyl group, a substituted or unsubstituted aryl group or a substituted or unsubstituted heterocyclic group; R$_2$ represents a hydrogen atom, a substituted or unsubstituted alkyl group, a substituted or unsubstituted aryl group or a substituted or unsubstituted heterocyclic group; R$_3$ represents a substituted or unsubstituted alkyl group, substituted or unsubstituted aryl group or a substituted or unsubstituted heterocyclic group; k and l represent an integer of 0<k<8 and an integer of 0<l<8, provided that k and/or l each independently represents a number satisfying 4≦k+l≦8.

According to one exemplary embodiment of the ozone stable cyan dye, appropriate dye-based inks include the following structure:

Formula 2 wherein
X$_1$=SO$_2$(CH$_2$)$_3$SO$_3$Li, k=3, X$_2$=SO$_2$(CH$_3$)$_3$SO$_2$NHCH$_2$CH(OH)CH$_3$, and l=1;

Though any effective amount of dye can be used in each color component of the present inkjet ink formulation, the inkjet ink can comprise from approximately 0.1 wt % to 10 wt % of the dye.

Further details of the above-mentioned ozone stable cyan and magenta dyes are provided in WO 02/083795 A2 and WO 03/062324 A1 respectively, which applications are incorporated by reference herein in their entireties.

Liquid Vehicle

As mentioned previously, the ink-jet ink compositions of the present system and method are typically prepared using an aqueous formulation or liquid vehicle. In one exemplary aspect of the present system and method, the liquid vehicle can comprise from about 70 wt % to about 99 wt % of the ink-jet ink composition.

According to one exemplary embodiment, the present exemplary ink vehicle includes a number of humectant co-solvents configured to provide hydrophilic properties to the resulting ink, while aiding in the dissolution and/or dispersing of ink components. According to one exemplary embodiment, the present ink vehicle may include any number of humectant co-solvents including, but in no way limited to, 2-pyrollidinone, LEG-1, glycerol, diethylene glycol, trimethylolpropane, 1,5-pentanediol, and/or the like.

In addition to the above exemplary specific co-solvents that can be used, classes of co-solvents that can be used include, but are in no way limited to, aliphatic alcohols, aromatic alcohols, diols, glycol ethers, polyglycol ethers, caprolactams, formamides, acetamides, and long chain alcohols. Examples of such compounds include, but are in no way limited to, primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

According to one exemplary embodiment, the present exemplary ink vehicle includes between approximately 10% and 70% humectant co-solvents. More particularly, according to one exemplary embodiment, the present exemplary ink vehicle includes between approximately 10% and approximately 35% 2-pyrollidinone.

Further, in addition to the above-mentioned components of the present exemplary vehicle, various other additives may be employed to optimize the properties of the resulting inkjet ink composition for specific applications. More specifically, examples of acceptable additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Further, sequestering agents, such as EDTA (ethylene diamine tetraacetic acid), may be included to eliminate the deleterious effects of heavy metal impurities, and buffer solutions may be used to control the pH of the resulting ink. According to one exemplary embodiment, from 0 wt % to 2.0 wt %, of the vehicle, for example, can include sequestering agents. Viscosity modifiers and buffers may also be present, as well as other additives known to those skilled in the art to modify properties of the ink as desired. Such additives can be present at, according to one exemplary embodiment, from 0 wt % to 20.0 wt %.

Surfactants

As mentioned previously, any number of surfactants plus a fluorocarbon surfactant formed at least in part from a polymer made based on oxetane chemistry may be included in the present exemplary ink formulation. Specifically, according to one exemplary embodiment, the ink vehicle of the magenta component of the present exemplary ink formulation includes fluorocarbon surfactants such as those formed at least in part from a polymer made based on oxetane chemistry having the Formula 3 below

FORMULA 3

Wherein $Q_1$ and $Q_2$ are independently selected from the group consisting of H, $SO_3^-W^+$, $COO^-W^+$, and COOH and wherein W is selected from the group consisting of $NH_4$, Li, Na, and K;

$R_4$ and $R_2$, are independently selected from the group consisting of H and OH;

$R_1$, and $R_5$ are independently selected from the group consisting of $O(CH_2)_m$—$(CF_2)_m$—$CF_3$ wherein m=1–3 and n=0–3;

$R_3$ is selected from the group consisting of $(CH_2)_L$ and and

L=1–4; x=1–10; y=1–30; and z=1–10.

In an exemplary embodiment, the oxetane-based fluorocarbon surfactant is formed from at least a polymeric material having L=4; m=1; n=1; and $R_2$ and $R_4$=H.

Examples of suitable oxetane-based fluorocarbon surfactants include, but are not limited to those generally available from companies such as Omnova Solutions, Inc. of Fairlawn, Ohio under the trade name of PolFox® fluorocarbon surfactants. Exemplary PolyFox® surfactants include PolyFox® PF-136A, PolyFox® PF-151N, PolyFox® PF-154N, and PolyFox® PF-156A, PolyFox® AT-1121.

According to one exemplary embodiment, the new ozone stable magenta dyes listed above exhibit surfactant-like properties that interact with the typical surfactants found in ink-jet inks. This interaction causes the surface tension of the magenta ink to be in the 31-32 dynes region, whereas, other typical inks using the same surfactants would have a surface tension of 28-29 dynes. However, the addition of a fluorocarbon surfactant formed at least in part from a polymer made based on oxetane chemistry lowers the surface tension of the ozone stable magenta dyes to about 28 dynes and maintained the desired surface tension with additions of the fluorocarbon surfactant in quantities between approximately 0.25% and 2%.

EXAMPLES

The following example illustrates the embodiments of the system and method that are presently best known. However, it is to be understood that the following is only exemplary or illustrative of the application of the principles of the present system and method. Numerous modifications and alternative compositions, methods, and systems may be devised by those skilled in the art without departing from the spirit and scope of the present system and method. The appended claims are intended to cover such modifications and arrangements.

Thus, while the present system and method has been described above with particularity, the following example provides further detail in connection with what is presently deemed to be the most practical and preferred embodiments of the present system and method.

Example 1

A number of traditionally used surfactants were added to a commercially available ozone stable Fuji magenta ink to lower the surface tension. Specifically, DOWFAX 2A1 (alkyldiphenyloxide disulfonate manufactured by The Dow Chemical Company), NDAO (N,N-dimethyl-N-dodecyl amine oxide), SURFYNOL 465 (a surfactant product of Air Products and Chemicals, Inc.), TERGITOL 15S-5 (a secondary alcohol ethoxylate manufactured by The Dow Chemical Company), TERGITOL 15S-7 (a secondary alcohol ethoxylate manufactured by The Dow Chemical Company), ZONYL FSA (a lithium carboxylate anionic fluorosurfactant manufactured by Dupont), and ZONYL FSN (thoxylated nonionic fluorosurfactant manufactured by Dupont) were independently combined with a commercially available ozone stable Fuji magenta ink and the surface tension was measured. However, each of the traditionally used surfactants failed to achieve the desired 28 dynes surface tension, even at 2% loading. ZONYL FSA did lower the surface tension, however it was lowered too far, about 25 dynes, at 0.5%. In contrast to the traditionally used surfactants, when a fluorocarbon surfactant formed at least in part from a polymer made based on oxetane chemistry was used, the surface tension was lowered to approximately 28 dynes and held constant in the 0.25% to 2% loading range. Further, when a commercially available ozone stable Fuji magenta ink that contained 0.2% fluorocarbon surfactant formed at least in part from a polymer made based on oxetane chemistry was printed next to a commercially available ozone stable Fuji cyan ink, the cyan to magenta bleed was stopped or significantly decreased.

Example 2

In a second example, a fluorocarbon surfactant formed at least in part from a polymer made based on oxetane chemistry was added to various ozone stable cyan and magenta dyes at differing loading ranges. The surface tension of each ink was then measured as illustrated in Table 1 below.

TABLE 1

|  | % Fluorocarbon Surfactant | | | | | | | |
| --- | --- | --- | --- | --- | --- | --- | --- | --- |
|  | 0 | 0.050 | 0.100 | 0.015 | 0.299 | 0.400 | 0.497 | 0.599 |
| Dynes/cm Magenta A | 31.9 | 28.4 | 27.8 | 27.1 | 26.9 | 26.7 | 26.4 | 26.5 |
| Dynes/cm Magenta B | 31.5 | 28.1 | 27.4 | 26.7 | 26.9 | 26.6 | 26.5 | 26.5 |
| Dynes/cm Cyan A | 29 | 27 | 26.3 | 26 | 25.6 | 25.6 | 25.6 | 24.9 |
| Dynes/cm Cyan B | 29.2 | 27 | 26.3 | 26 | 25.7 | 25.6 | 25.5 | 25.5 |

As shown in Table 1, the addition of a fluorocarbon surfactant formed at least in part from a polymer made based on oxetane chemistry, even at small loading ranges reduced the surface tension of the ozone stable magenta dyes toward the desired range of 28 dynes/cm, thereby demonstrating that the a fluorocarbon surfactant formed at least in part from a polymer made based on oxetane chemistry is a uniquely robust surfactant for the ozone stable magenta dyes.

In conclusion, the present system and method for producing an exemplary ink-jet ink formulation is configured to control cyan to magenta bleed when using ozone stable dyes in inkjet inks. Particularly, the inclusion of a fluorocarbon surfactant formed at least in part from a polymer made based on oxetane chemistry with an ozone stable magenta dye reduces the surface tension of the dye to a desired 28 dynes/cm. At approximately 28 dynes/cm cyan to magenta bleed is prevented. Additionally, use of a fluorocarbon surfactant formed at least in part from a polymer made based on oxetane chemistry as a surfactant also improves the cyan to magenta bleed that typically occurs when an image is stored under humid conditions.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An ink set comprising:
   an ozone stable cyan ink; and
   an ozone stable magenta ink;
   wherein said ozone stable magenta ink includes an ozone stable magenta dye, and a liquid vehicle including a fluorocarbon surfactant formed at least in part from a polymer comprising Formula 1:

Formula 1 where R1=OH and R2=O(CH2)$_m$—(CF2)$_n$—CF$_3$ with m=1-3 and n=0-3;

and wherein said ozone stable magenta dye is selected from the group consisting of Magenta Dye I, Magenta Dye II, and Magenta Dye III;

Magenta Dye I

-continued

Magenta Dye II

Magenta Dye III wherein Magenta Dye I has R substituents selected from the group consisting of Combination A, Combination B, Combination C, Combination D, and Combination E:

Combination A
R1 = —SCH$_3$
R2 = —CH$_3$
R3 = CN
R4 = H
R5 = C$_8$H$_{17}$(t)
R6 = —C$_6$H$_4$—C$_8$H$_{17}$ Combination B
R1 = —C$_6$H$_5$
R2 = H
R3 = CONH$_2$
R4 = H
R5 = —C$_6$H$_4$—SO$_3$K
R6 = —C$_6$H$_4$—SO$_3$K Combination C
R1 = —S—CH$_2$CH$_2$—SO$_3$K
R2 = CH$_3$
R3 = H
R4 = —(benzothiazol-2-yl)-6-SO$_3$K

R5 = —C$_6$H$_4$—SO$_3$K
R6 = —C$_6$H$_4$—SO$_3$K

Combination D
R1 = —C$_6$H$_4$—SO$_3$K
R2 = H
R3 = H
R4 = 2-(benzothiazolyl) with NHSO$_2$-aryl-OC$_8$H$_{17}$(T), (t)C$_8$H$_{17}$
R5 = 2,4,6-trimethylphenyl (H$_3$C, CH$_3$, H$_3$C)
R6 = C$_8$H$_{17}$(t)

Combination E
R1 = —C$_6$H$_5$
R2 = H
R3 = H
R4 = 2-(benzothiazolyl) with NHSO$_2$-aryl-OC$_8$H$_{17}$(T), (t)C$_8$H$_{17}$
R5 = 2,4,6-trimethylphenyl (H$_3$C, CH$_3$, H$_3$C)
R6 = C$_8$H$_{17}$(t)

wherein Magenta Dye II has R substituents selected from the consisting of Combination F and Combination G:

Combination F
R1 = 5-CH$_3$
R2 = H
R3 = CN
R4 = H

-continued

R5 =

R6 =

Combination G

| R1 | = | 5-NO$_2$ |
|---|---|---|
| R2 | = | CH$_3$ |
| R3 | = | H |
| R4 | = | SO$_2$CH$_3$ |
| R5 | = | |
| R6 | = | | wherein 5-CH$_3$ and 5-NO$_5$ denote the R1 substituent at position 5 of Magenta Dye II, and wherein Magenta Dye III has R substituents as set out in Combination H:

Combination H

| R1 | = | Me |
|---|---|---|
| R2 | = | CH$_3$ |
| R3 | = | CN |
| R3 | = | H |
| R5 | = | |
| R6 | = | |

2. The ink set of claim 1, wherein said fluorocarbon surfactant formed at least in part from a polymer comprising Formula I, the fluorocarbon surfactant being represented by Formula 3:

FORMULA 3 wherein

Q$_1$ and Q$_2$ are independently selected from the group consisting of H, SO$_3^-$W$^+$, COO$^-$W$^+$, and COOH and wherein W is selected from the group consisting of NH$_4$, Li, Na, and K;

R$_4$ and R$_2$, are OH;

R$_1$, and R$_5$ are independently selected from the group consisting of O(CH$_2$)$_m$—(CF$_2$)$_n$—CF$_3$ wherein m=1-3 and n0-3;

R$_3$ is selected from the group consisting of (CH$_2$)$_L$ and

FORMULA 3

L=1-4; x=1-10; y=1-30; and z=1-10.

3. The ink set of claim 1, wherein said ozone stable magenta ink has a surface tension of approximately 28 dynes/cm.

4. The ink set of claim 1, wherein said ozone stable magenta ink includes between approximately 0.25% to 2% of said fluorocarbon surfactant formed at least in part from a polymer comprising Formula I.

5. The ink set of claim 1, wherein said ozone stable cyan ink comprises an ozone stable cyan dye, and a liquid vehicle.

6. The ink set of claim 5, wherein said ozone stable cyan dye comprises Formula 4

Formula 4 wherein M represents a hydrogen atom, a metal atom or an oxide, hydroxide or halide thereof; Pc represents a (k+1)-valent phthalocyanine nucleus represented by Formula 4; X$_1$ and X$_2$ each independently represents a substituent selected from the group consisting of —SO—R$_1$, —SO$_2$—R$_1$ and —SO$_2$NR$_2$R$_3$ and at least one substituent represented by X$_1$ and at least one substituent represented by X$_2$ are present in respective rings of four benzene rings (A, B, C and D in Formula 4) of the phthalocyanine nucleus, provided that X$_1$ and X$_2$ are not the same and at least one of X$_1$ and X$_2$ has an ionic hydrophilic group as a substituent; R$_1$ represents a substituted or unsubstituted alkyl group, a substituted or unsubstituted aryl group or a substituted or unsubstituted heterocyclic group; $R_2$ represents a hydrogen atom, a substituted or unsubstituted alkyl group, a substituted or unsubstituted aryl group or a substituted or unsubstituted heterocyclic group; $R_3$ represents a substituted or unsubstituted alkyl group, a substituted or unsubstituted aryl group or a substituted or unsubstituted heterocyclic group; k and l represent an integer of $0<k<8$ and an integer of $0<l<8$, provided that k and/or l each independently represents a number satisfying $4 \leq k+l \leq 8$.

7. The ink set of claim 5, wherein said ozone stable cyan dye comprises wherein $X_1=SO_2(CH_2)_3SO_3Li$, k=3, $X_2SO_2(CH_3)_3SO_2NHCH_2CH(OH)CH_3$, and l=1.

8. The ink set of claim 1, wherein said ozone stable cyan ink is free of said fluorocarbon surfactant formed at least in part from a polymer comprising Formula I.

9. The ink set of claim 1, wherein said ink set further comprises:
   an ozone stable yellow ink; and
   an ozone stable black ink.

10. An ozone stable magenta ink comprising:
    an ozone stable magenta dye; and
    a liquid vehicle including a fluorocarbon surfactant formed at least in part from a polymer comprising Formula 1:

Formula 1 where R1=OH and R2=O(CH2)$_m$(CF2)$_n$-CF3 with m=1-3 and n=0-3, wherein the fluorocarbon surfactant is represented by Formula 3:

FORMULA 3 and wherein
$Q_1$ and $Q_2$ are independently selected from the group consisting of H, $SO_3^-W^+$, $COO^-W^+$, and COOH;
W is selected from the group consisting of $NH_4$, Li, Na, and K;
$R_4$ and $R_2$, are OH;
$R_1$, and $R_5$ are independently selected from the group consisting of $O(CH_2)_m$—$(CF_2)_n$—$CF_3$ wherein m=1-3 and n=0-3;
$R_3$ is selected from the group consisting of $(CH_2)_L$ and L=1-4; x=1-10; y=1-30; and z=1-10;
and wherein said ozone stable magenta dye is selected from the group consisting of Magenta Dye I, Magenta Dye II, and Magenta Dye III:

Magenta Dye I

Magenta Dye II

Magenta Dye III

11. The ink of claim 10, wherein said ozone stable magenta ink has a surface tension of approximately 28 dynes/cm.

12. The ink of claim 10, wherein said ozone stable magenta ink includes between approximately 0.25% to 2% of said fluorocarbon surfactant formed at least in part from a polymer comprising at least one Formula 1:

Formula 1 where R1=OH and R2=O(CH2)$_m$-(CF2)$_n$-CF3 with m=1-3 and n=0-3; said polymer being measured by weight.

13. The ink set of claim 10, wherein said ozone stable cyan ink is free of said fluorocarbon surfactant formed at least in part from a polymer comprising Formula 1:

Formula 1

Where R1=OH and R2=O(CH2)$_m$-(CF2)$_n$-CF$_3$ with m=1-3 and n=0-3.

* * * * *

UNITED STATES PATENT AND TRADEMARK OFFICE
CERTIFICATE OF CORRECTION

PATENT NO. : 7,741,385 B2
APPLICATION NO. : 11/555069
DATED : June 22, 2010
INVENTOR(S) : Deardurff

It is certified that error appears in the above-identified patent and that said Letters Patent is hereby corrected as shown below:

In column 14, line 51, in Claim 1, delete "III;" and insert -- III: --, therefor.

In column 16, line 56, in Claim 1, after "the" insert -- group --.

In column 17, line 53, in Claim 2, delete "Formula I," and insert -- Formula 1, --, therefor.

In column 18, line 9, in Claim 2, delete "n0-3;" and insert -- n=0-3; --, therefor.

In column 18, lines 15-20, in Claim 2, delete "  " and insert --  --, therefor.

In column 18, line 30, in Claim 4, delete "Formula I." and insert -- Formula 1. --, therefor.

In column 18, line 58, in Claim 6, delete "(k+1) and insert -- (k+1) --, therefor.

In column 19, line 29, in Claim 8, delete "Formula I." and insert -- Formula 1. --, therefor.

In column 19, line 51, in Claim 10, delete "O(CH2)$_m$" and insert -- O(CH2)$_m$- --, therefor.

In column 22, line 12, in Claim 13, delete "Where" and insert -- where --, therefor.

Signed and Sealed this
Seventeenth Day of May, 2011

David J. Kappos
*Director of the United States Patent and Trademark Office*

In column 22, line 12, in Claim 13, delete "$CF_3$" and insert -- CF3 --, therefor.